United States Patent [19]

Doty

[11] Patent Number: 4,461,493

[45] Date of Patent: Jul. 24, 1984

[54] TENSION RELIEVING MECHANISM FOR A SEAT BELT RETRACTOR AND CONTROL MEANS THEREFOR

[75] Inventor: Gerald A. Doty, Crown Point, Ind.

[73] Assignee: Gateway Industries, Inc., Hazel Crest, Ill.

[21] Appl. No.: 345,200

[22] Filed: Feb. 2, 1982

[51] Int. Cl.³ .............................................. B60R 21/10
[52] U.S. Cl. .................................. 280/807; 242/107.6
[58] Field of Search .............. 280/801, 806, 807, 808; 242/107.6, 107.7

[56] References Cited

U.S. PATENT DOCUMENTS

| | | | |
|---|---|---|---|
| 3,700,184 | 10/1972 | Francis | 242/107.6 |
| 3,917,019 | 11/1975 | Pearson et al. | 242/107.6 |
| 3,973,786 | 8/1976 | Rogers, Jr. | 280/807 |
| 4,007,948 | 2/1977 | Stephenson et al. | 280/807 |
| 4,261,531 | 4/1981 | Naitoh | 242/107.6 |
| 4,361,294 | 11/1982 | Doty | 242/107.7 |

Primary Examiner—Joseph F. Peters, Jr.
Assistant Examiner—Ross Weaver
Attorney, Agent, or Firm—Fitch, Even, Tabin & Flannery

[57] ABSTRACT

A seat belt retractor having a tension relieving mechanism has a new and improved control and release means for operating the mechanism to release the tension relieving mechanism from its tensionless mode and allow seat belt retraction. Preferably, the control means includes a circuit means with a bimetallic member which is electrically energized by the electrical system of the vehicle when a door and/or user actuated switch is closed. The device eliminates the need for a heavy, bulky mechanical release linkage between the door and a tension relieving mechanism of a type currently used. The electrical switches can be closed with a minimal amount of force, and the door actuated switch does not add to the force needed to close the door of the vehicle.

The device is used to release a tension relieving mechanism of the type having a clutch spring which frictionally grips a rotatable member connected to the retractor reel shaft. The frictional grip of the clutch spring is released when the clutch spring interacts with an engagement member to expand the spring coils. When the bimetallic member is unheated, the release device holds the clutch spring preventing interaction between the clutch spring and the engagement member, and the immobilized clutch spring, gripping the rotatable member, prevents the reel shaft from turning in a belt retraction direction. However, when the bimetallic member is energized and heated it deforms shifting the release device to allow interaction between the clutch spring and the engagement member resulting in coil expansion, release of the frictional grip and retraction of the seat belt.

24 Claims, 21 Drawing Figures

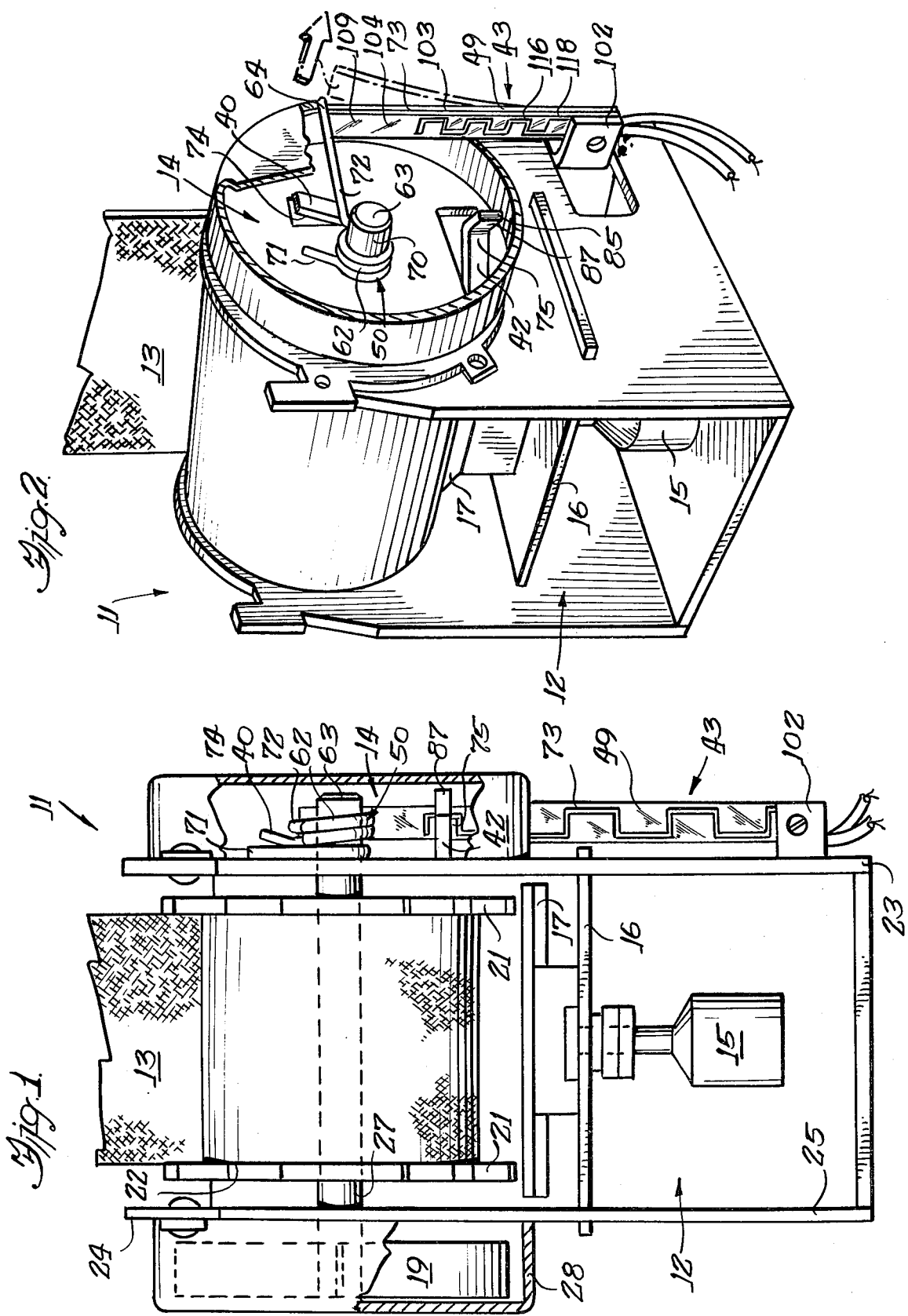

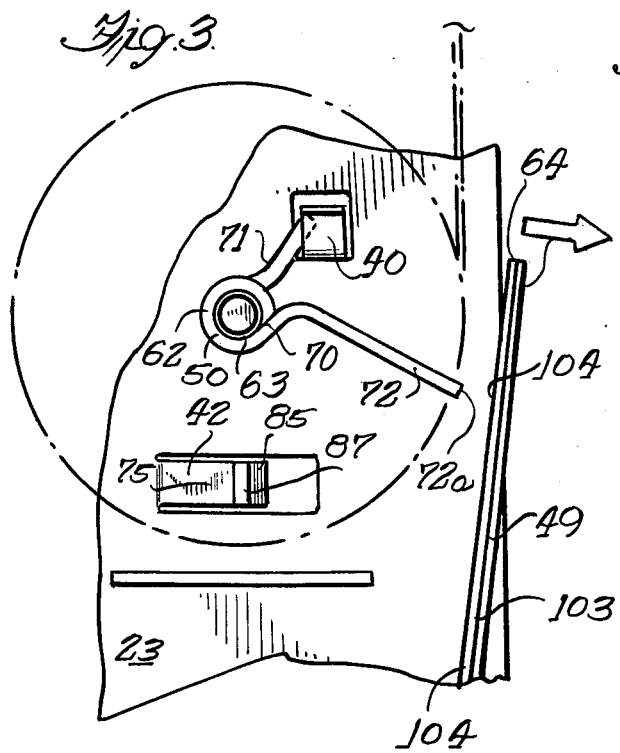
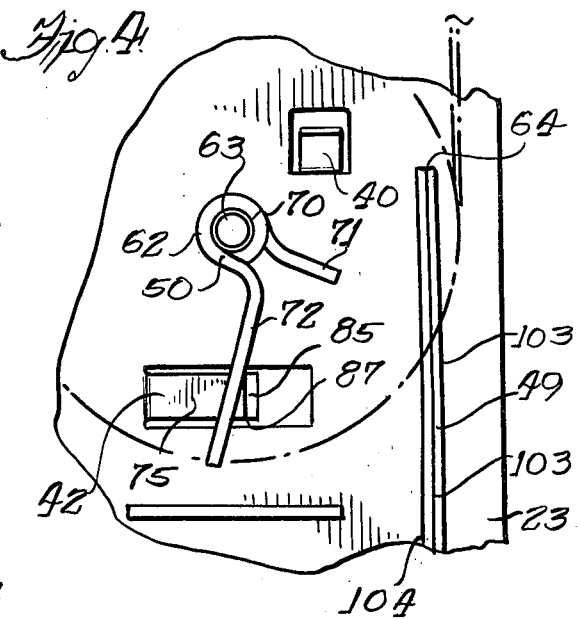
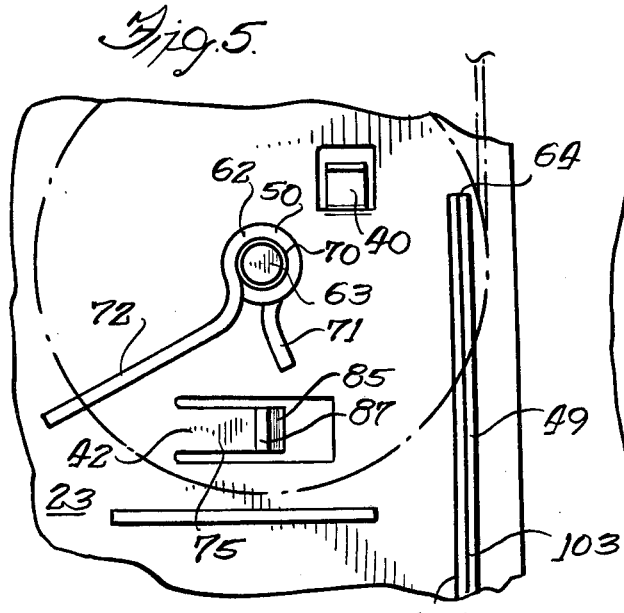
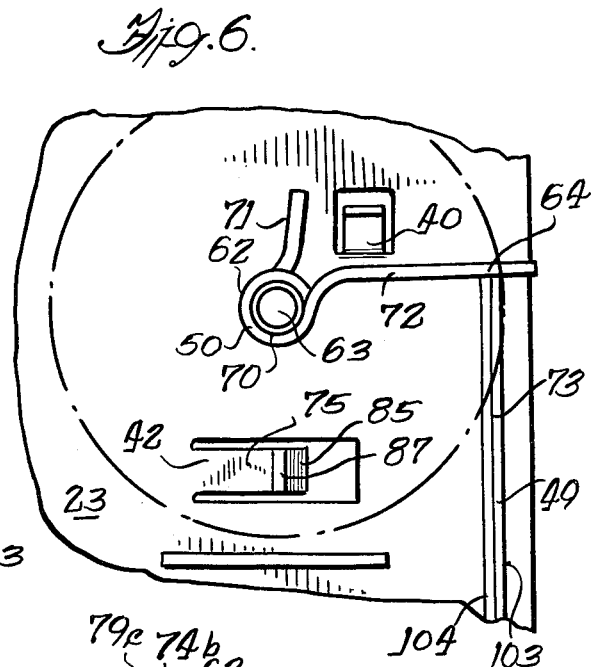
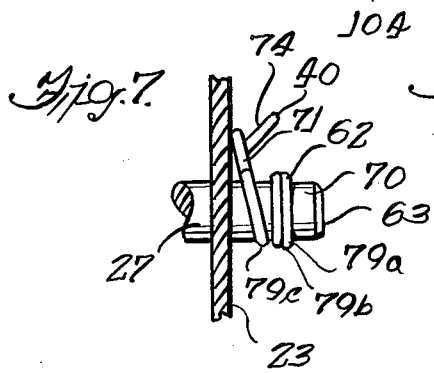
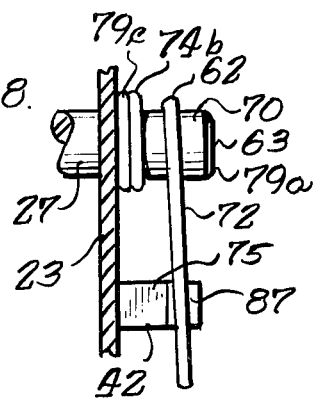

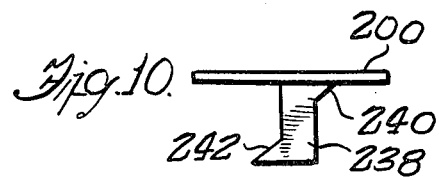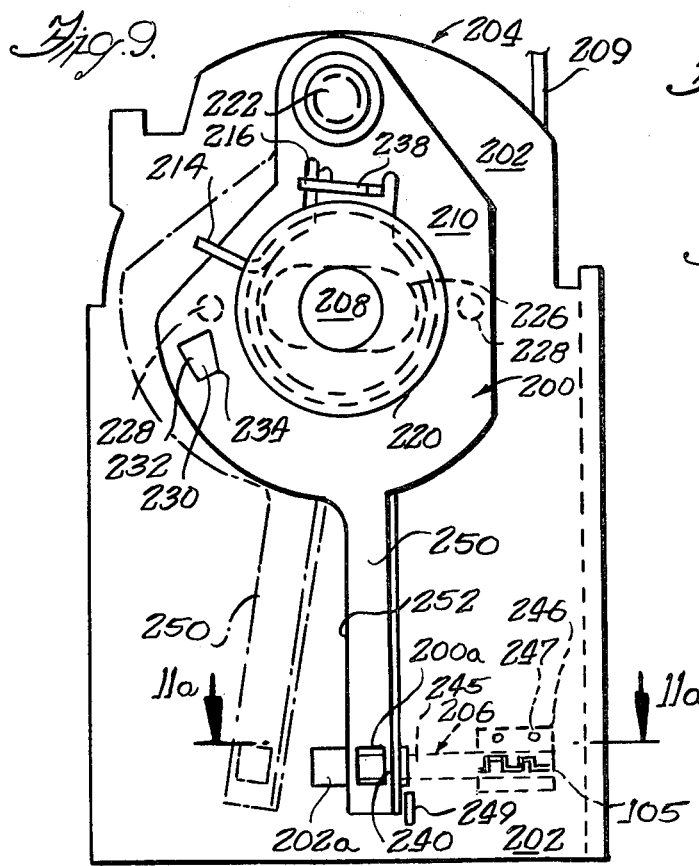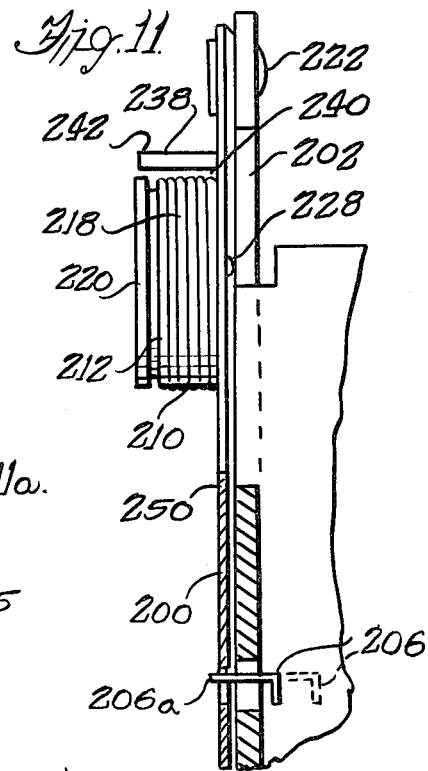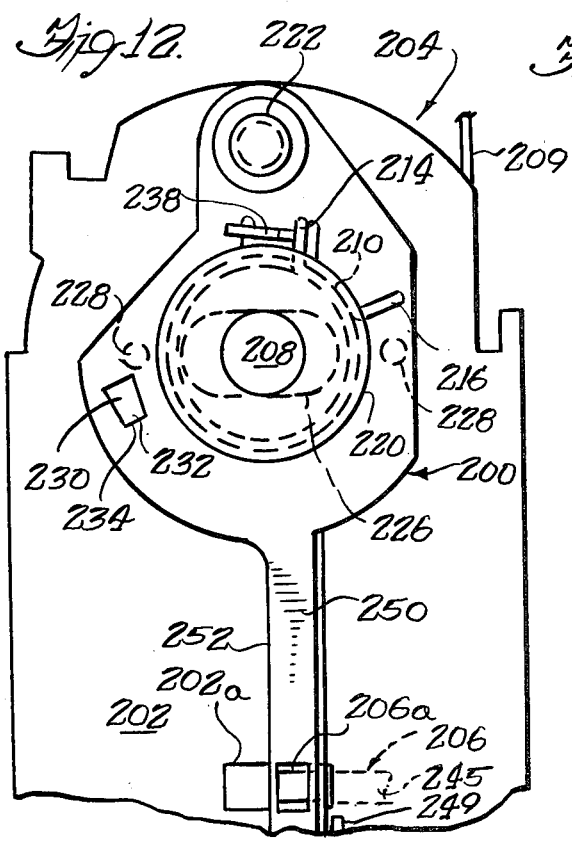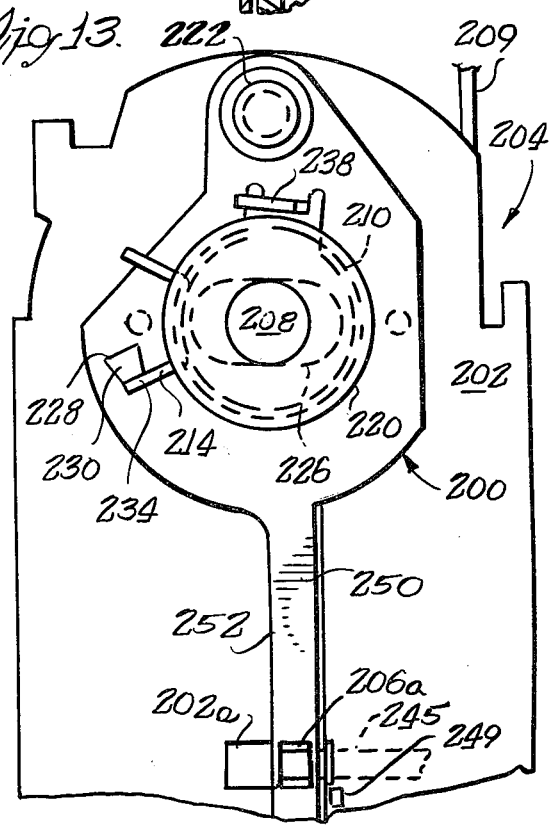

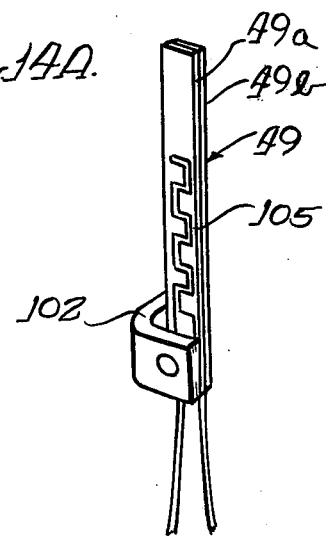
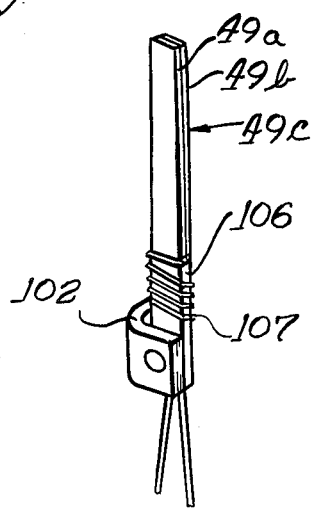
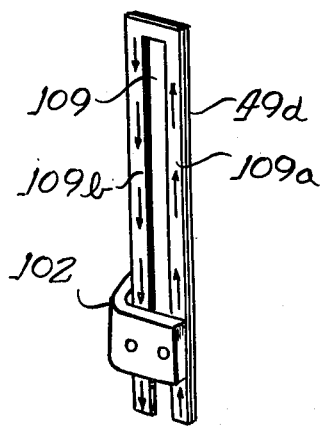
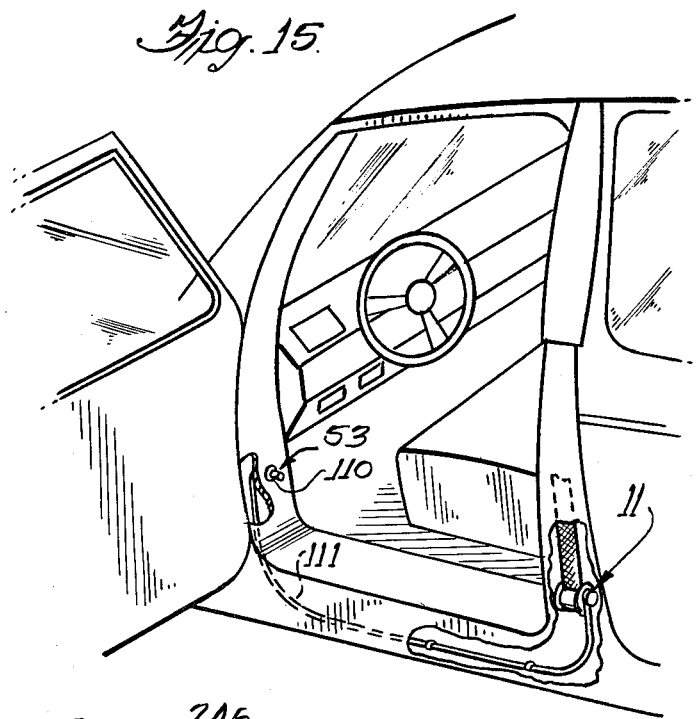
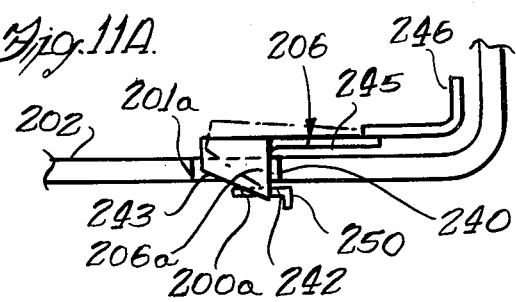

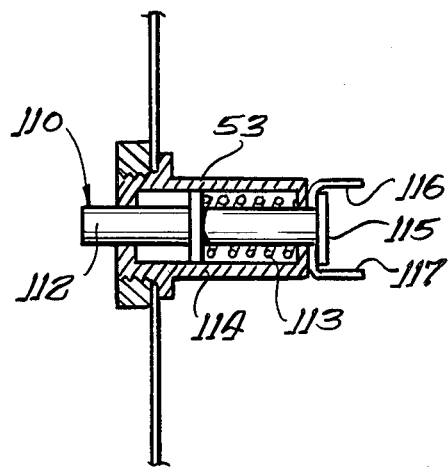
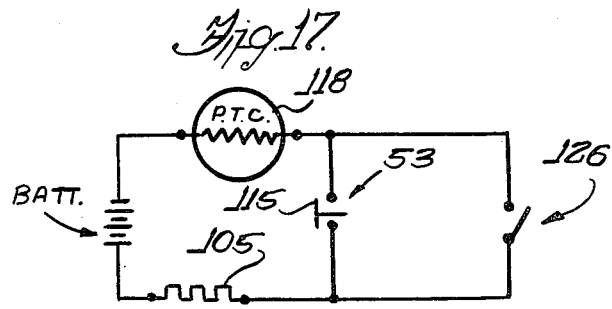
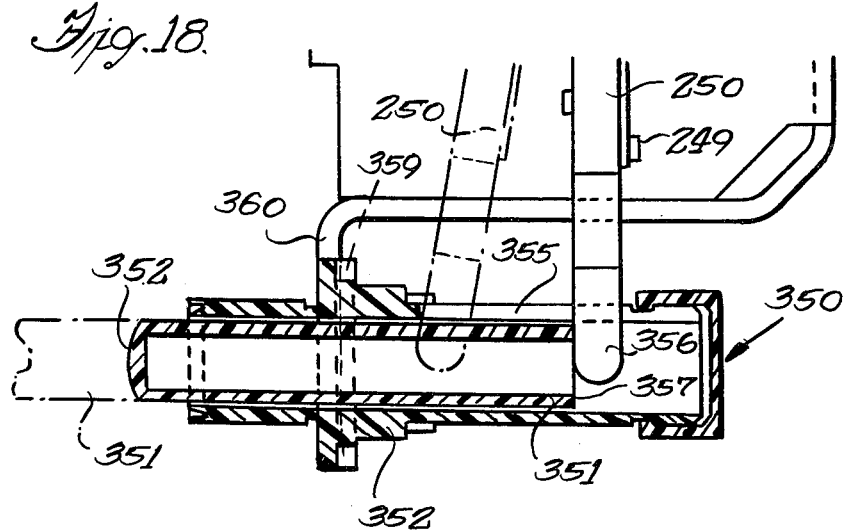

TENSION RELIEVING MECHANISM FOR A SEAT BELT RETRACTOR AND CONTROL MEANS THEREFOR

This invention relates to safety belt systems having a mechanism for relieving the seat belt around the passenger's body from at least a portion of the tension of the reel winding spring and more particularly to an improved method for releasing the tension relieving mechanism to permit seat belt retraction.

This invention is directed to a belt system having a shoulder belt connected to a belt retractor having a winding spring which exerts tension on the belt to rewind the shoulder belt when the belt is removed from the wearer. Present seat belt retractor systems, particularly the so called "single loop" systems, have a large or heavy winding spring to assure that the lap belt is pulled tightly across the wearer through a sliding D ring or tongue plate of a three-point restraining belt system. In the single loop and other three-point systems, it has been proposed to provide tension relieving devices, typically using discs to operate a pawl into and from engagement with a detent wheel fixed to the reel shaft. Such devices are shown in U.S. Pat. Nos. 3,851,836; 3,869,098 and 3,834,646. To assure release of such devices when a door of the vehicle is opened, it has been proposed in U.S. Pat. No. 3,973,786 to provide means operable by the door to shift the pawl to a release position to assure that the winding spring will rewind the seat belt, if it was not previously rewound, as the occupant opens the vehicle door to exit. The typical remotely controlled mechanism for releasing the tension relieving mechanism requires a turning of the retractor reel in the protraction direction for a slight distance to allow the pawl to be lifted from toothed engagement with the detent wheel. This is because the rake of the teeth on the detent wheel causes the tip of the detent wheel to overhang the pawl preventing a simple outward movement of the pawl. These remote control release mechanisms have become heavy and complex in their mechanisms to overcome the strong retractor spring and to pivot the pawl from the detent wheel; and, as such, they have become expensive.

The use of a solenoid to release the tension relieving mechanism has also been disclosed in U.S. Pat. No. 4,002,111. Other proposals have been to provide a counterbiasing spring which acts in opposition to the winding spring and is connected thereto by a selectively operated pawl means. Such a proposal is disclosed in U.S. Pat. No. 4,026,494. Other proposals have been made to similarly connected counterbiasing springs which bias the reel in a belt unwinding direction when connected to the reel. In these systems, camming discs have been used to effect the connection and/or disconnection as the counterbiasing springs to the reel. When connected, the counterbiasing spring effectively substracts from the winding torque of the reel winding spring to reduce the belt tension load on the occupant's shoulder.

A tension release mechanism is described in my U.S. Pat. No. 4,361,294 in which a coil spring is wound around an extension of the reel shaft, the spring constricting to engage the shaft extension and expanding to release the shaft extension from its frictional grip. The spring has tangs extending radially outward from its ends which engage camming and stopping surfaces that provide for selective engagement of the coil spring with the shaft extension to hold the reel against rewinding the belt, i.e., in a tension relieving mode, or to allow the reel to turn and exert a rewinding force onto the belt to rewind the same.

Although some of the above-described patented proposals are in use, they generally involve a number of pieces which are relatively expensive by the time they are assembled and secured onto the retractor. Furthermore, such mechanism generally requires a significant force to release and may interfere somewhat with the easy opening and closing of the vehichle door. Thus, there is a need for a new and improved kind of tensionless mechanism which may be released with a more simple mechanism requiring less force for operation thereof.

It is a general object of this invention to provide a new and approved release mechanism for tension relieving mechanisms of seat belt retractors. Further, it is an object of this invention to provide release mechanisms which provide substantially no resistance to door closing and which are easily actuated by the occupant of a vehicle.

These and other objects and advantages of the invention will become apparent from the following detailed description taken in connection with the accompanying drawings in which:

FIG. 1 is a front elevation view of a seat belt retractor having a tension relieving mechanism and a release mechanism to override the same and embodying various features of the invention.

FIG. 2 is a perspective view of the seat belt retractor;

FIG. 3 is a side elevation view of the tension relieving mechanism of FIG. 1;

FIG. 4 is a side elevation view of the tension relieving mechanism during belt protraction;

FIG. 5 is a side elevation view of the tension relieving mechanism after the belt has been pulled to activate the same;

FIG. 6 is a side elevation view of the tension relieving mechanism upon subsequent release of the belt and in the tension relieving mode;

FIG. 7 is a front elevation view of the coiled spring with the coils expanded and moving axially inward;

FIG. 8 is a front elevation view of the coiled spring with the coils expanded and moving axially outward;

FIG. 9 is a side elevation view of an alternative embodiment of a seat belt retractor having a tension relieving mechanism and a release mechanism embodying various features of the invention;

FIG. 10 is a plan view of a barrier having camming surfaces for shifting the coil spring of the retractor of FIG. 9 axially inward or outward;

FIG. 11 is a fragmentary front elevation view of the seat belt retractor of FIG. 9;

FIG. 11a is fragmentary, sectional view taken substantially along the line 11A—11A of FIG. 9;

FIG. 12 is a side elevation view of the retractor of FIG. 9 during belt protraction:

FIG. 13 is a side elevation view of the retractor of FIG. 9 with the tension relieving mechanism engaged;

FIGS. 14a, 14b and 14c illustrate various embodiments of the bimetallic bar.

FIG. 15 is a diagramatic illustration of a vehicle having a door operated switch means for operating a bimetallic member.

FIG. 16 illustrates a door operated switch.

FIG. 17 is an electrical schematic of a control circuit means for the bimetallic member.

FIG. 18 illustrates a further embodiment of the invention in which a mechanical remotely controlled member is used for controlling the automatic release of the tension relieving mechanism.

As shown in the drawings for purposes of illustration, the invention is embodied in a conventional safety belt retractor 11, which may be of various shapes or configurations but typically includes an emergency operating locking mechanism 12 for operating to prevent further belt extraction at the time of an accident. While the emergency operating locking mechanism 12 may be of the belt or reel sensitive kind operated by fast protractions of the belt 13 the preferred emergency locking mechanism is of the vehicle inertia operated kind which comprises a pendulum weight 15 as illustrated in FIG. 1 mounted on support bar 16 for swinging movement to operate a pivotally mounted locking bar or pawl 17 to pivot into locking engagement with a pair of ratchet wheels 21 mounted on opposite sides of webbing reel 22 mounted for rotation on a reel shaft 27 extending between opposite vertical frame sides 23 and 24 of a retractor frame 25. The reel shaft 27 is journaled to rotate in the side frames 23 and 24 and a spirally wound clock-like spring 19 is attached to one end of the reel shaft 27 to rewind the seat belt 13. This rewind spring 19 is mounted within a protective cover 28 attached to the side frame 24.

U.S. Pat. No. 3,834,646 discloses a conventional tension relieving mechanism for a seat belt retractor operable by a mechanical release mechanism when the door of the vehicle is opened to deactivate the tension relieving mechanism and allow the reel to rewind the seat belt automatically. Such mechanical release mechanisms have tended to be bulky and weighty, disadvantages which are particularly significant in attempts to produce smaller, lighter automobiles. Furthermore, the springs of one type or another, by which such release mechanisms commonly operate, provide considerable tension and interfere somewhat with the easy opening and closing of the vehicle door. This conventional mechanisms include a spring biased plunges operable by the door to pivot a lever which has a free end moveable to shift a tension relieving pawl from a tension relieving ratchet wheel to allow the belt to rewind.

The seat belt retractor is of the type having a reel 22 that is spring-biased in the belt retraction direction. The locking means 12 prevents belt protraction in case of an accident and the tension relieving mechanism 14 prevents retraction of the belt when worn by the occupant The tension relieving mechanism 14 includes a rotatable member 63 member having a frictional surface 70 connected to the retractor reel shaft 27 and a coil spring means 50 therearound which is wound to naturally constrict to frictionally grip the frictional surface and when the coil spring means is held to hold the rotatable member and reel against rotation in the belt retraction direction. In order to retract the seat belt, means 40 are provided for engaging the spring 50 and expanding the spring coil 62 thereby releasing the frictional grip of the coil spring on the frictional surface. The preferred tension relieving mechanism may be operated between its tension relieving position of FIG. 2 and the belt rewind position by manipulation of the seat belt to cause ends of tangs 71 and 72 of the coil spring means 50 to cooperate with actuation members 40 and 42 and shift the coil spring means 50 to either grip the frictional surface 70 on the reel shaft 27 or to release this frictional grip to allow belt rewind. This action will be explained in greater detail hereinafter.

In accordance with the present invention, a new and improved tension relieving mechanism and control means therefor is achieved by the use of a bimetallic member 49 which deflects or deforms to change the state or condition of the tension relieving mechanism. The bimetallic member is in a control circuit means which applies electrical current to the bimetallic member when the door is opened to cause the bimetallic member 49 to heat and bend. Herein the bimetallic member 49 deforms when heated to shift the release mechanism into a non-interaction preventing or release mode to cause automatic rewind of the belt if the tension relieving mechanism was holding the belt against rewind. The bimetallic member 49 is heated by an electrical circuit connected to automotive's electrical circuit when a switch 53 (FIG. 17) is closed when the car door is opened. The switch requires minimal force for actuation as compared to the plunger and lever mechanism heretofore operated by the door.

According to one embodiment, the tension relieving mechanism 14 utilizes the locking coil spring means 50 having the spring coil 62 for frictionally gripping the rotatable member 63 connected to and turnable with the reel shaft 27, and it is operated by engagement members, 40, 42 which change the diameter of the coil to either constrict and frictionally grip a friction surface 70 on the rotatable member or to release the friction surface. The engagement members 40, 42 are preferably integral with one of the sides 23 of the retractor frame 25 to engage end portions 71, 72 of the spring means 50 for releasing the frictional grip. The coiled spring means 50 is axially shiftable along the rotatable member 63 by camming surfaces of the engagement members 40, 42 to alternately move the end portions 71, 72 into alignment with the various stopping and camming surfaces 74, 75 of the tension relieving mechanism. A very light force is required to release the frictional engagement of the coil 62 with the turnable member 63. To retract the belt 13 as, for example, when the door is opened, release mechanism 43, cooperates with the end portions 71, 72 to release the friction surface.

Herein, the rotatable member 63 is an extension of the reel shaft 27, and the coil spring means 50 is a single wire spring. The spring 50 comprises the central cylindrical clutch coil 62 having multiple turns, for example, three turns 79a, 79b, 79c (FIG. 7) wound for an interference fit with the shaft extension 63 and straight end portions or tangs 71, 72 which extend generally tangentially to the shaft axis from the inner and outer ends of the coil 62. The coil turns 79 each have a free inner diameter which is less than the outer diameter of the shaft extension 63. As will be explained in greater detail hereinafter, to release the tension relieving mechanism 14, it is merely required to shift one of the tangs 71 or 72 in a radially outward direction to slightly increase the diameter of the coil 62 which then releases the friction surface 70 allowing the reel shaft 27 and reel 22 to turn and rewind the belt.

A first engagement member 40 is stamped from and is bent to angle outward from the plane of the frame side 23. The engagement member 40 is disposed close to the shaft extension 63 in a radial direction and protrudes sufficiently outward from the frame side 23 that the inner tang 71, whether in its inward axial position or in its outward axial position, will make contact between its camming surface 74 and the frame side 23 when the coil 62 is rotated in the clockwise direction. When the tang 71 is in its inner axial position, the engagement member 40 serves as a stop for the inner tang 71 limiting rotation of the coil 62 in the clockwise direction. If the inner tange 71 is in its outward axial position, it will contact the outer end of the camming surface 74 and be cammed inward before stopping.

The second engagement member 42 is stamped from and is bent to angle outward from the frame side 23. The second engagement member 42 is disposed radially outward of the first engagement member 40 so that the end of the short inner tang 71 always passes thereby during rotation. The outer surface 75 of the second engagement member 42 angles outward from the frame side 23 a sufficient distance that the longer outer tang 72 contacts and cams outward thereagainst as the spring 50 is rotated in the conterclockwise direction. The outer end 85 of the second engagement member 42 is further bent, generally perpendicularly outward from its camming surface 75 providing a surface 87 to stop the outer tang 72 and limit rotation of the coil 62 in the counterclockwise direction. The outer tang 72 is spaced axially outward of the inner tang 71 a sufficient distance that it always passes over the first engagement member 40 whether the coil 62 is in its inward or outward axial position.

The tension relieving mechanism holds the belt in its tension relieving condition when the long tang 72 abuts the bimetallic member 49 is held thereby against further turning in the belt rewind direction, as shown in FIG. 2. When the coil spring 50 is in its inward position, the bimetallic member or bar 49 is disposed within the sweep of the outer tang 72 with the top end 64 positioned to abut the tang 72 as it sweeps clockwise, whereby the bar 49 stops clockwise rotation of the coil spring 50. In the illustrated embodiment, the bimetallic bar 49 is secured to a bracket 102 (FIGS. 1 and 2) stamped from the lower end of the reel frame side 23 and bent perpendicularly outward therefrom. The bar 49 is mounted close to the frame, and its width is such that when the coil spring 50 is in its outward axial position, the outer tang 72 is sufficiently outward to sweep past the vertical edge 73 of the bar 49. The illustrated bimetallic bar 49 (FIG. 3) is resiliently deformable and is bent momentarily out of the way when the outer tang 72a of the tang 72 moving in a counterclosewise direction contacts its front face 104 and bends it about its lower end. Conversely, the bar 49 is sufficiently rigid its lengthwise dimension that it stops the outer tang 72 when the outer tang, sweeping in a clockwise direction, hits the upper edge or stopping surface 64 of the bar. The above description of the bimetallic bar 49 refers to its normal or unheated condition in which the bar, as shown in solid in FIG. 2, is generally straight and upright. However, when the bar 49 is heated, the differential expansion of one face thereof bends the free upper end 109 bending away from the shaft extension 63, as shown in ghost in FIG. 2, allowing the outer tang 72 to sweep past its front face 104 even when the spring tang 72 is in its inward axial position.

As will be discussed hereinafter, the bimetallic bar or actuator 49 has many forms and shapes. The shape illustrated in FIGS. 14A-14C is that of what is sometimes referred to as an electrothermal actuator which, as seen in FIG. 14a, includes two side-by-side strips of metal 49a and 49b in intimate engagement with one another along their length with a resistant heater strip 105 of a zigzag configuration disposed along the actuator side of the strip 49a of the bimetallic bar. These electrothermal actuators are manufactured by coating a bimetallic bar with a high temperature insulating film and depositing a film of conducting material by vapor deposition over the insulated film. The thin film of conducting material is photochemically processed i.e. etched to leaving a conductive grid strip 105. The electrical current through the grid strip 105 heats the grid and bimetallic metal bar. The deflection response is fast due to the intimate contact between the grid resistant heater strip 105 and the bimetallic bar.

Another form of bimetallic bar 49c is shown in FIG. 14b and it includes the bimetallic strips 49a and 49b which project upwardly from a lower insulator of ceramic 106 or the like about which is wound a coil of resistant wire 107 which acts as a heater when the current is applied thereto. This likewise will bend the bimetallic bar 49c. A still further form of bimetallic bar is shown in FIG. 14c in which the bimetallic is formed with a generally u-shaped configuration with an elongated vertical slot or opening 109 defining a pair of legs 109a and 109b each of which is formed of bimetallic. When the current is applied in the direction of the arrows going up the leg 109a and across the top of the bimetallic bar and down the leg 109b the bimetallic bar will heat and deform.

These bimetallic actuators are only by way of example and other bimetallic bars or actuator designs may be used. Several additional designs will be discussed hereinafter in connection with a further embodiment of the invention.

While the switch means may take many different configurations, FIG. 15 illustrates a common switch 53 located as part of a door plunger assembly 110 which is connected by suitable electric cable 111 to the retractor 11 in which is the bimetallic bar. FIG. 16 illustrates a conventional door operating switch means 110 which includes a spring biased plunger 112 biased by a spring 113 within a housing 114 to move an electrical bridging contact 115 into electrically engaging contact with a pair of spaced electrical connectors 116 and 117 which may be connected to a pair of leads within the electric cable 111. Thus, it should be clear that when the door is closed and the plunger 112 is pushed to the right in FIG. 16 that the metallic bridge 115 opens the circuit between the connectors 116 and 117. Conversely, when the door is opened, the spring 113 will push the plunger 112 to the left to carry the electrical bridging contact 115 on the end of the plunger into contact with the electrical connectors 116 and 117 thereby completing the ciruit to the bimetallic bar. Diagramatically, the electrical circuit means shown in FIG. 17 may include the usual automotive battery with the bridging contact 115 of the door actuated switch means 53 being closed to complete a circuit through the electrical heating resistant element 105 to heat the same. One manner of operating the circuit is to limit the time period in which the heat is applied to the heating resistance 105, by use of a circuit opening device such as a positive temperature co-efficient thermistor 118. The thermistor 118 works like an ordinary resistor for most of its temperature range but when is operated and sufficient heat is applied thereto it switches abruptly to a very high resistence thereby limiting a current flow through the circuit to the heating resistance grid 105. Other forms of circuit opening devices such as switches may be used.

A description of the operation of the retractor and the tension release will now be given in reference to the sequence of drawings from FIGS. 2-8.

The starting position will usually be with the seat belt webbing 13 stowed and fully wound onto the reel 22 prior to the occupant's pulling of the belt to lift the belt to a position about his body. At this initial rewind position (FIG. 3) the spring coil 62 is in its inward axial position with the inner short tang 71 located between the frame side 23 and the first engagement member 40, the outer long tang 72 disposed about 330° from the stopping surface 87 on the second engagement member 42 and clockwise relative to the stopping surface 64 of the bimetallic bar 49. The spring coil 62 is constricted and is gripping the friction surface 70 of the shaft extension 63. As the user pulls the end of the belt 13 to protract the belt webbing from the reel 22, the shaft 27 is rotated in a counterclockwise direction rotating the shaft-gripping spring coil 62 therewith. As the outer tang 72 sweeps counterclockwise, its outer end 72a hits the front face 104 of the bimetallic bar 49 flipping the bar momentarily radially outward until the tang 72 clears the bar, after which the bar 49 springs back to its upright oposition. Upon further rotation, the outer tang 72 passes axially outward of the first engagement member 40 and then contacts the outer camming surface 75 of the second engagement member 42. The outer long tang 72 slides up the camming surface 75 biasing the outermost coil turn 79a outward until the tang abuts the stop end 87 (FIG. 4) of the second engagement member preventing the spring coil 62 from further counterclockwise rotation along with the shaft extension 63; however, as the coil is right-hand wound, the restrained outer tang 72 is urged radially outward (FIG. 8) causing expansion of the coil turns 79 thereby releasing the grip of the spring coil 62 on the friction surface 70. As the inner coils, 79b and 79c are loosened relative to the shaft extension 63, they are biased outwardly by the outer tang 72 and outer turn 79a until the entire coil 62 has relocated to its outward axial position. Because only a very minimal force is required to open the spring coil 62 to release its grip on the friction surface 70, the abutment of the outer tang 72 against the stop end 87 will be generally unnoticed by the user.

After the user has protracted the belt 13 a sufficient distance to enable him to insert the tongue plate in the belt buckle, the user releases the belt, and the reel rewind spring 19 begins to turn the reel 22 in the clockwise direction to retract the belt. As the shaft 27 rotates in a clockwise direction with the spring coil 62 in its outward axial position, the restraint of the outer tang 72 against the stopping surface 87 is relaxed, and the spring coil 62 contracts once again gripping the friction surface 70 and the coil spring turns along with the shaft extension 63 in the counterclockwise direction passes axially outward of the first engagement member 40 and past the outer vertical edge 103 of the bar 49. The inner tang 71, however, contacts the outer end of the camming surface 74 of the first engagement member 40, and as the shaft 27 and the shaft extension 63 continue to rotate in the clockwise direction, the inner tang is cammed inward by the camming surface until it is stopped between the engagement member 40 and the frame side 23. Because the inner tang 71 is restrained from further clockwise rotation, the spring coil 62 cannot rotate with the shaft extension 63. Instead, the inner tang 71 is urged radially outward enlarging the diameter of the coil 62 thereby releasing its grip on the friction surface 70. Because the diameters of the coil turns 79 are enlarged and released from the friction surface 70, the outer turns 79a, 79b follow the inner tang 71 and the inner turn 79c inward relocating the coil 62 to its inward axial position as illustrated in FIG. 7, returning the tension relieving mechanism 14 to its initial (FIG. 3) position.

To alleviate the discomfort of wearing a belt 13 which is constantly tending to retract and bind the occupant, the occupant may activate the tension relieving mechanism 14 by once again pulling the belt 13 outward a short distance, i.e., about 1 to about 5 inches whereby the spring 50 is rotated to an intermediate axial position, such as shown in FIG. 5, but a lesser distance, i.e., less than the 6 inches, than is required to reengage the outer tang 72 with the second engagement member 42. Upon re-release of the belt 13, the shaft extension 63 and coil 62 are rotated clockwise once again by the reel spring 19 until the upper tang 72 abuts the upper edge 64 of the bimetallic bar 49 (FIG. 6). The outer tang 72 is prevented from further clockwise rotation, and as further rotational force exerted by the reel spring 19 only serves to encourage the natural constriction of the coil turns 79 on the friction surface 70 thereby tightening the grip of the coil 62, the reel shaft 27 is prevented from further clockwise rotation thereby releasing belt tension. Thus, the belt is in its tensionless position as shown in FIGS. 2 and 6.

With the tension relieving mechanism activated, the user may lean forward in his seat protracting the belt 13 a short distance without deactivating the tension relieving mechanism because, unless the user pulls the belt outward a sufficient distance to reengage the outer longer tang 72 with the second engagement member 42, the coil 62 remains in its inward axial position and will return its long tang 72 to its tension relieving position abutting the upper edge 64 of the bar (FIG. 6) when the user leans back to his normal sitting position. This intermediate movement from tensionless and back into tensionless is usually called "memory" as the device remembers to return to the tensionless state.

When the user unbuckles his belt 13, he will generally not pull the belt any significant distance outward, and hence the tension relieving mechanism 14 will still be in its tension relieving position (FIG. 6) preventing retraction of the belt. However, when the user opens the door of the vehicle, the depressed switch plunger 112 (FIG. 16) closes the switch contacts 116 and 117 thereby heating the bimetallic bar 49. As the bar 49 heats, it deforms bending away from the shaft extension 63 as shown by the arrow in FIG. 2 and from contact with the tang 72, as shown in dotted lines, allowing the coil 62 to rotate with the shaft extension to its starting position (FIG. 3) with the inner tang 71 held by the frame side 23 and first engagement member 40. As long as there is reel spring tension on the reel shaft 27, the inner tang 71 is urged radially outward expanding the spring coil to release its grip of the friction surface 70 thereby allowing the shaft to rotate and retract the belt 13. Of course, when the belt 13 is fully retracted and the reel shaft 27 is no longer urged in the clockwise direction, the constricting force of the spring coil 62 reestablishes its grip on the friction surface 70 in preparation for the next protraction of the belt.

When the bar 49 is deenergized, it cools to ambient temperatures and returns to its upright position where it resumes its function as a stop for the clockwise sweep of the outer tang 72. Although closing the door to depress the button 112 deenergizes the bar, it is preferred that the circuit which energizes the bar have a circuit opening means such as the P.T.C. thermister 111 (FIG. 17) which effectively opens the circuit for the heating resistance 105 on the bimetallic bar within about 60 seconds of initial energization so as not to draw an unnecessary amount of power from the battery if the car door is left open for an extended period of time.

The user may also choose to release the belt 13 from the tensionless mode to rewind the belt merely by protracting the belt sufficiently to cause the outer long tang 72 to hit the stop end 87 of the second engagement member 42 so that further protraction of the belt expands the coil 62 resulting in the coil subsequently sliding outward to its outward axial position and then by the use releasing the belt. The coil 62 in its outward position grips the shaft extension 63 and turns with it in the clockwise direction with the outer tang 72 passing along the vertical edge 103 of the bimetallic bar 49 until the lower tang 71 engages the lower camming surface 74 of the member 40 resulting in subsequent expansion of the coil turns 79 thereby releasing the friction surface 70. This allows retraction of the belt 13 and an inward axial sliding of the coil 62 to the position of FIG. 3 which is the start position for a fully wound reel.

As a convenient alternative means for releasing the tension relieving mechanism 14 should an occupant wish to remove and retract the seat belt 13 with the door still closed, an optional switch 126 is provided in the passenger compartment to close the bar-energizing circuit. When the user switch 126 is actuated to close the circuit, the bimetallic bar 49 is energized and bends outward to release the tension relieving mechanism. The user switch 126 might be conveniently associated with the device that releases the belt tongue plate from the belt buckle.

While the seat belt retractors have been described hereinabove as having a configuration in which belt protraction rotates the reel in a counterclockwise direction, the retractor mechanism may have a configuration with a clockwise belt-protraction direction, in which case the rotational directions for the described embodiments will be uniformly opposite to those described. Likewise, rather than the coil spring contracting to grip an internal shaft, the coil spring may be encircled by an outer drum surface to grip the latter when the spring coil expands. Thereby, reversing the direction of releasing and gripping with coil contraction and coil expansion.

Illustrated in FIGS. 9 through 13 is an alternative embodiment of a retractor 204 having a tension relieving mechanism and release therefor according to the present invention in which the means to engage a coiled spring and means to prevent interaction between the coiled spring and engagement means are carried by a swinging plate 200 mounted from the frame side 202 of the retractor. Swinging of the plate 200 between a tension relieving position and a seat belt retracting or release position is controlled by a control means which includes a bimetallic bar 206 which deforms when heated.

A rotatable reel shaft extension 208 in the form of a cylindrical drum fixed to the reel shaft has a cylindrical frictional surface 212 which is encircled by a coiled spring 210. The latter constricts to grip the frictional surface 212 (FIG. 11) thereof. In this case, the spring 210, which has an inner tang 214 and an outer tang 216 extending radially outward from its ends, is left-hand wound whereby restraint of the inner tang in its counterclockwise sweep and restraint of the outer tang in its clockwise sweep, acts to expand the spring coil 218. The spring 210 is disposed on the shaft extension drum 208 between the plate 200 and an annular flange 220 on the outer end of the shaft extension drum 208, the distance between the plate and the flange being sufficient to permit axial travel of the coil spring 210 along the drum surface 212. The plate 200 is suspended for easy swinging motion by a pivot mounting means including a pivot pin 222 at the upper end of the frame side 202. The plate 200 swings between a tension relieving position shown in solid in FIG. 9, to a seat belt retraction or release position shown in ghost in FIG. 9. The plate 200 has an elongated arcuate slot 226 through which the reel shaft extends, the elongated slot permitting the plate to swing in an arcuate motion relative to the reel shaft. The plate 200 also carries a pair of integral depressions 228 which slide along the outer surface of the frame side 202 minimizing friction between the plate and the frame side as the plate swings. The coil spring 210 acts to swing the plate back and forth as hereinafter described.

Herein, the retractor 204 is described with reference to its upright position illustrated in FIG. 9 in which the pivot pin 222 is above, i.e., at about 12 o'clock, relative to the shaft extension drum 208. When the belt 209 is protracted, the reel shaft and extension drum surface 212 are rotated in a counterclockwise direction, as viewed in FIG. 9. The shaft is spring-biased in a clockwise direction in FIG. 9 to turn the reel for belt retraction. It is to be understood, that the invention is not limited to the upright orientation, and a seat belt retractor described with reference to FIGS. 9 through 13 can have alternative orientations.

A radial outer engagement member or catch 230 is stamped from and angled outward from the swinging plate 200 provides an outer surface 232 over which the inner long tang 214 of the spring 210 cams as it sweeps counterclockwise and an end edge 234 which engages the inner long tang as it sweeps clockwise, providing that the coil spring 210 is in its inward axial position. The inner long tang 214, however, passes by the catch 230 when the spring 210 is in its outward axial position. As a means to engage the spring 210 to expand its coil 218, the plate 200 also carries an engagement member or barrier 238 extending perpendicularly outward therefrom which engages the outer tang 216 sweeping clockwise and the inner tang 214 sweeping counterclockwise. Either case of the tangs 214, 216 of the coiled spring 210 engaging the barrier 238 results in expansion of the left-hand wound coil 218. The preferred engagement member or barrier 238 (as seen in FIG. 10) also provides a pair of camming surfaces, one surface 240 at its inner end in the path of the inner tang 214 sweeping counterclockwise and one surface 242 in the path of the outer tang 216 sweeping clockwise. The inner camming surface 240 is inclined outward to shift the inner tang 214 axially outward, and the outer camming surface 242 is inclined inward to shift the outer tang 216 axially inward. When either of the tangs 214, 216 engages the barrier 238, it expands the spring coil to release its grip on the friction surface 212. As the tang cams along the inclined surface, it causes the coil 218 to shift in the axial direction to which the tang is being shifted.

Contact of the tangs 214, 216, with either the catch 230 or the barrier 238 also acts to swing the plate 200 between its tension relieving and release position. When the inner tang 214 sweeps clockwise and contacts the stopping edge 234 of the catch 232 at about 8 o'clock, it exerts a force against the plate urging it clockwise about 222 or towards its release position. Whether or not the plate actually swings clockwise depends upon whether the control means including the bimetallic bar is in its effective position in which it blocks this clockwise swinging. When outer tang 216 sweeps clockwise and contacts the barrier 238, disposed about 12 o'clock just below the pivot mount 222, it exerts a force thereagainst urging the plate to swing it counterclockwise on its pivot mount 222.

To prevent the inner tang 214 from swinging the plate 200 clockwise each time it sweeps clockwise and engages the edge of the catch 230, the plate has a downwardly extending arm 250 for engaging the bimetallic bar 206.

For the purpose of releasing the seatbelt retractor for automatic rewind upon the opening of the car door, which actuates the switch means 53, there is provided the bimetallic bar 206 which functions to hold the swinging plate 200 in the solid line position in FIG. 9 and also in the position of FIG. 13. When the bimetallic bar is heated and bends, it shifts to a position (shown in dotted lines in FIG. 9) allowing the swinging plate 200 to move and thereby release the coil spring from its gripping of the shaft drum 208 and allowing the reel shaft to turn and rewind the belt on the reel. More specifically, the swinging plate herein is provided with a long depending arm 250 which is disposed adjacent the retractor frame plate 202. Preferably, the retractor frame plate has an opening 202a therein through which projects a portion or tab 206a of the bimetallic bar 206.

The preferred tab 206a (FIG. 11A) has a blocking edge 240 which abuts against a vertical sidewall 242 defining the right side of an opening 200a in the swinging plate 200. This particular orientation of the bar 206 provides sufficient strength and rigidity to hold the plate 200 against turning movement in the clockwise direction as seen in FIG. 9. Preferably, the outer edge 243 of the tab 206 is inclined so that upon return of the arm 250 it will abut the inclined edge 243 and will cam the bimetallic plate inward if the same were in the blocking position when the arm 250 is returning from its release position shown in dotted lines in FIG. 9 to its usual position shown in solid lines in FIG. 9. A stop 249 projects outward from the stationary retractor frame plate 202 to be abutted by the right hand edge of the arm 250 to limit the counterclockwise swinging of the plate 200 and to align the opening 202a in the arm with the tab 206a, which then projects therethrough.

Herein the bimetallic bar 206 is shown as being mounted by a bracket 246 to the retractor frame. The bar 206 comprises a pair of flat metal strips 245 on which is adhered the heating resistance elements 105 which heat flat strips 245 to bend the same in the manner hereinbefore described.

The strips 245 of the bimetallic bar are parallel to the retractor frame plate 202. Thus, the swinging plate arm 250 will be exerting a tensile force at the edge 243 of the tab 206a to pull the bimetallic bar in the direction of its length rather than trying to bend the bar in a direction normal to its length. Thus, the bimetallic bar may be kept relatively thin for bending in a direction normal to its length upon heating and yet have sufficient rigidity not to bend when the arm 250 pushes against the tab 206a.

To more fully describe the seat belt retractor 204, a sequence of operations for the tension relieving mechanism will now be described. In the starting position shown in FIG. 9 with the seat belt fully retracted, the coiled spring 210 is in its inward axial position with the outer tang 216 closely adjacent the barrier 238 and the inner tang 214 between the catch 230 and the barrier. The plate 200 is swung to its tension relieving position with its arm 250 extending straight downward.

The occupant protracts the seat belt 209 by pulling with sufficient force to overcome the reel spring, rotating the shaft 208 in a counterclockwise direction. The coiled spring 210 is constricted around the shaft extension drum 208 and rotates therewith. At the beginning of the pull, the inner tang 214 contacts the inclined outer surface 232 of the catch 230, cams thereover and drops back along the side of the plate 200 after passing the catch. The inner tang 214 continues to sweep counterclockwise until it contacts the inclined camming surface 240 of the barrier 238 at about 12 o'clock (FIG. 12). Contact of the inner tang 214 with the barrier 238 opens the spring coil and prevents the spring 210 from continuing to rotate with the reel shaft extension drum 208, because the left-hand wound spring coil 218 expanded in response to restraint of the inner tang 214. Because the inner tang 214 was cammed axial along the inner camming surface 240, it pushes the coil 218 radially outward along the shaft extension when the coil expands.

When the occupant releases the belt 209, the reel spring (not shown) rotates the shaft and drum 208 clockwise. Because the coiled spring 210 is now in its radially outward position, the inner tang 214 is rotated by the drum clockwise over the catch 232 and this brings the other, outer tang 216 into contact with the outer inclined camming surface 242 of the barrier 238. Contact of the outer tang 216 along the cam surface 242 shifts the tang 216 inward and this abutting the barrier causes coil expansion and resulting shift of the coil 218 to its axially inward position (FIG. 9). Because the outer tang 216 continues to be pressed against the barrier 238, the shaft extension 208 is free of the grip of the spring 210 resulting in the reel spring exerting continuous tension on the belt 209 pulling the belt against the occupant's lap and or shoulder.

To relieve belt tension on the occupant, the occupant pulls the belt 209 slightly outward, i.e., between about 1 inches and about 5 inches. Again the inner tang 214 cams over the inclined catch surface 232 and snaps back against the plate 200. This time however, the belt 209 is not pulled until the outer tang 216 sweeps into the barrier 238, and the coil 218 remains in its inward axial position. When the belt 209 is released, the inner tang 214 catches the engagement edge 234, FIG. 13, of the catch 230 and is held against further clockwise sweep. The engagement of the inner tang 214 with the stopping surface 234 reinforces the grip of the spring 210 on the shaft extension 208 and the shaft is held against further clockwise belt retraction rotation. The engagement of the inner tang 214, tends to urge the plate 200 to swing clockwise, but such swinging is prevented by the engagement of the tab 206a of the bimetallic bar 206 with the plate arm 250. In this position, therefore, reel spring tension is removed from the belt 209 and the tension relieving mechanism is in its tensionless state.

With the retractor in its tension relieving position (FIG. 13) the occupant may lean forward in his seat protracting the belt a short distance without deactivating the tension relieving mechanism because unless the user pulls the belt sufficiently outward so that the inner tang 214 hits the barrier 238 in its counterclockwise sweep, the coil gripping the shaft extension drum 208 carries the tang 214 back to engage the barrier. This returns the retractor to its tension relieving position of FIG. 13 when the occupant leans back in his seat, this being the "memory" of the tensionless device.

When an electrical switch means 53 is closed by opening the door and the device is in its tensionless state the bimetallic bar 206 heats and bends as seen in ghost in FIG. 11a releasing its engagement with the arm 250 of the plate 200. More specifically, the blocking tab 206a on the bimetallic bar pulls in toward the plate 202 to its dotted line position shown in FIG. 11a and from the hole 200a in the swinging plate thereby releasing the swinging plate to turn in a clockwise direction. The force of the inner tang 214 against the catch 230 causes the plate 200 to swing clockwise and the swinging plate carries its catch 230 radially outward of the sweep of the inner tang 214 thereby releasing the tang 214 and allowing the spring 210 to rotate clockwise with the drum 208 until the spring 210 brings the outer tang 216 into contact with the barrier 238 at about 12 o'clock. When the outer tang 216 hits the barrier 238, it initially swings the plate 200 counterclockwise about the pivot pin 222 resetting the plate. Further the restraint on the outer tang 216 causes the spring coil to expand and releases the grip of the coil 218 on the shaft extension drum 208 permitting the shaft to rotate free of the coil spring 210 until the belt 209 is fully retracted. When the bimetallic bar 206 is deenergized, it cools and straightens returning its tab 206a into opening 202a in the arm 250 to hold the swinging plate in the initial state of FIG. 9. In the meantime, the belt will have been rewinding onto the reel. The bimetallic bar may cool and return the tab 206a before the moveable plate swings back to the solid line position of FIG. 9 against the stop 249. The arm 250 will hit the inclined cam edge 243 (FIG-URE 11a) and merely bend the bimetallic arm inward until the opening 200a in the arm is aligned with the tab 206a which will then snap into the opening.

If the occupant desires to retract the belt without tripping the door actuated switch means 53, he may pull the belt 209 outward, e.g., over about 6 inches, until the inner tang 214 contacts the cam surface 240 on barrier 238 and this shifts the tang and the coil 218 outward with the coil releasing the drum 208. Upon subsequent release of the belt 209, the inner tang 214 sweeps across, i.e., outward of the catch 230 and the outer tang 216 sweeps clockwise into the cam surface 242 barrier 238, resulting in coil expansion and release of the grip of the coil spring on the shaft extension 208. The belt will not continue to fully rewind. Alternatively, the occupant may actuate the switch 126 in the passenger compartment which energizes the bimetallic bar 206 allowing the plate 200 to swing clockwise so that the outer tang 216 sweeps clockwise into the barrier 238.

In accordance with a still further embodiment of the invention as to be described hereinafter in connection with FIG. 18, the moveable plate 200 and its arm 250 are held in the solid line position of FIGS. 9 and 13 during the tensionless mode of operation of a tension relieving mechanism by means including a door operated mechanical mechanism 350 which includes a moveable member such as a plunger 351, which when the door is closed, blocks the arm 250 from traveling clockwise and away from the stop 249 as above-described. When the door opens the force of the coiled spring 210 acting through the arm 250 pushes the slidable plunger 351 to the left as viewed in FIG. 18 within a plunger housing 352 allowing the arm 250 to swing to the dotted line position and to cause the automatic tension release for automatic belt rewind as previously described. The plunger has an exterior face 352 to be engaged directly by the door when the door closes with the door holding the plunger 351 in the solid line position shown in FIG. 18. The plunger housing 352 has an upper open slot 355 through which the extended end 356 of the level 250 extends to abut the internal end 357 of the plunger. The plunger housing 352 is secured by a nut 359 to a bent bracket portion 360 connected to the retractor frame. Thus, the plunger acts in the manner of the tab 206a to hold the moveable plate 200 in its usual position allowing belt manipulation to control the tension or tensionless mode until such time as the door is opened. The opening of the door releases the blocking member 357 or 206a for the arm 250 allowing the moveable plate 200 to pivot to release the tensionless mechanism and thereby cause automatic rewind of the belt.

In lieu of the plunger mechanism a lever or bail arrangement actuated by the door may be used to engage the end of the lever 250 either to block or to shift the same as the door opens. Such a bail or lever arrangement is described in an Application of Gerald A Doty, entitled Tension Relieving Mechanism, filed Jan. 20, 1982, the aforesaid application being incorporated by reference as if fully reproduced herein.

Several advantages of the invention may now be more fully appreciated. The use of a bimetallic bar to disengage the tension relieving mechanism eliminates the need for the space-occupying spring mechanisms heretofore used in association with tension relieving retractors. The button switches between the doors and door frames may be manufactured so as to require a minimal amount of force to operate. The use of an electrical release for a tension relieving mechanism also provides a conveninet method, i.e., a user controlled switch, for the occupant to actavate the release other than by pulling the belt outward. Such a user switch might conveniently be associated with the mechanism which releases the tongue plate of the belt from the belt buckle.

While the invention has been described in terms of certain preferred embodiments, modifications obvious to one with ordinary skill in the art may be made without departing form the scope of the invention. The use of a bimetallic member for tension relieving mechanism release has been described in terms of certain preferred embodiments of tension relieving mechanisms, but by appropriate placement of a bimetallic member, a release can be provided for a wide variety of tension relieving mechanism configuration.

Various features of the invention are set forth in the following claims.

1. In a safety belt retractor, the combination comprising:
 a rotatable reel having a belt wound thereabout for protraction and retraction from the reel;
 spring means biasing the reel to retract to rewind the belt onto the reel;
 a locking means for locking the belt against further protraction in times of an accident;
 tension relieving means moveable between a release position in which the tension of the spring means is free to pull on the belt and to urge the reel to rewind the belt and an actuated position for relieving the belt of the force of said spring means and holding the reel against rewinding the belt;

control means for actuating said tension relieving means to its release position including a bimetallic member; and an electrical circuit means for heating the bimetallic member and for deforming the same when the control means is actuating said tension relieving means to its release position.

2. In a safety belt retractor:

a rotatable reel having a belt wound thereabout for protraction and retraction from the reel;

spring means biasing the reel to retract to rewind the belt into the reel;

a locking means for locking the belt against further protraction at the time of an accident;

a rotatable member connected to said reel to rotate therewith and having a friction surface thereon;

a coiled spring means having a coil for frictionally gripping said frictional surface with a change in size of the coil to hold said member and said reel against rewinding the protracted belt thereby relieving tension of said spring means on the protracted belt worn by the occupant;

control means for changing the size of the coil to release said frictional grip of said coiled spring with said friction surface allowing belt retraction;

said control means including a bimetallic member which deforms when heated and which causes said coil to change size for belt retraction; and circuit means to electrically heat said bimetallic member.

3. A belt retractor in accordance with claim 2 in which said coil enlarges in size to release said frictional grip, said bimetallic member deforming when heated and allowing said coil to enlarge in size to allow rewind of said belt.

4. A belt retractor in accordance with claim 2 in which said control means includes a moveable member for shifting said spring coil to change its size, said bimetallic member controlling movement of said moveable member and thereby the changing of coil size.

5. A retractor in accordance with claim 4 in which the moveable member comprises a pivotally mounted plate blocked in movement in one direction by the bimetallic member, the bimetallic member deforming when heated and allowing pivoting of the plate.

6. A belt retractor in accordance with claim 5 in which said bimetallic member includes an elongated member having a free end, said free end bending to release said pivotally mounted plate to turn to release said coil spring from gripping said frictional surface.

7. A belt retractor in accordance with claim 2 in which the control means includes a switch means operable by a vehicle door to cause heating of said bimetallic member.

8. A belt retractor in accordance with claim 2 in which means are provided to interrupt the heating and deflection of said bimetallic member to allow the latter to return to its original position.

9. In a safety belt retractor a rotatable reel having a belt wound thereabout for protraction and retraction from the reel;

spring means biasing the reel to retract to rewind the belt into the reel, a locking means for locking the belt against further protraction at the time of an accident;

a rotatable member connected to said reel to rotate therewith and having a friction surface thereon;

a coiled spring means having a coil for frictionally gripping said friction surface with a change in size of the coil to hold said member and said reel against rewinding the protracted belt thereby relieving tension of said spring means on the protracted belt worn by the occupant;

first means for engaging said coiled spring when said rotatable member is biased in the belt retraction direction to enlarge the size of the coil to release said frictional grip of said coiled spring on said friction surface allowing belt retraction;

first means to shift said coiled spring in one axial direction when said coil is enlarged by said first engagement means;

second means for engaging said coiled spring when said rotatable member is biased in the belt protraction direction to enlarge the size of the coil to release said frictional grip of said coiled spring on said friction surface;

second means to shift said coiled spring in the other axial direction when the coil is enlarged by said second engagement means;

means for selectively preventing interaction between said first engagement means and said coiled spring means including a bimetallic member which prevents said interaction when unheated but deforms when heated to allow said interaction resulting in coil enlargement and belt retraction; and means to electrically energize said bimetallic member to heat the same.

10. A retractor according to claim 9 wherein said coiled spring has a first tang which contacts said first engagement member when said rotatable member is biased in the belt retraction direction and a second tang which contacts said second engagement member when said rotatable member is biased in the belt protraction direction.

11. A retractor according to claim 10 wherein said interaction preventing means has a stopping surface disposed in the sweep of said second tang in at least one of said axial spring positions when said bimetallic member is unheated, abutment of said second tang against said stopping surface preventing engagement of said first tang with said first engagement member.

12. A retractor according to claim 11 wherein said bimetallic member removes said stopping surface from the sweep of said second tang when heated.

13. A retractor according to claim 11 wherein said stopping surface is disposed out of the sweep of said second tang in one axial position of said spring and within the sweep of said second tang in the other axial position.

14. A retractor according to claim 9 wherein said first and second engagement members are carried by a plate, and said retractor has means mounting said plate for swinging said plate between a position where said coiled spring interacts with said first engagement means and a position where said coil spring does not interact said first engagement means.

15. A retractor according to claim 14 wherein said bimetallic member restrains said plate from swinging when unheated but permits said plate to swing when heated.

16. In a safety belt retractor, the combination comprising:

a rotatable reel having a belt wound thereabout for protraction and retractionfrom the reel;

spring means biasing the reel to retract to rewind the belt into the reel;

a locking means for locking the belt against further protraction at the time of an accident;

a rotatable member connected to said reel to rotate therewith and having a friction surface thereon;

a coiled spring means having a coil for frictionally gripping said frictional surface with a change in size of the coil to hold said member and said reel against rewinding the protracted belt thereby relieving tension of said spring means on the protracted belt worn by the occupant, opposite ends of the coil spring being actuatable to change the coil size;

control means for changing the size of the coil to release said frictional grip of said coiled spring with said friction surface allowing belt retraction;

said conrol means including a moveable plate, said movable plate having abutment members theron cooperating with the ends of the coiled spring to selectively engage the frictional grip or to release the frictional grip of the spring coil with the frictional surface, said control means including a remotely operated release means for allowing said movable plate to shift to a release portion to cause the coil spring to release the frictional surface to provide for automatic rewind of the belt.

17. A belt retractor in accordance with claim 16 in which said remotely operated release means comprises an electrical circuit means and a bimetallic member heated by said circuit means to deflect and thereby cause actuation of said moveable plate.

18. A belt retractor in accordance with claim 17 in which said bimetallic member comprises an elongated bar having a free end, a projecting tab on the free end of said bar engaging said moveable plate and blocking its movement toward a release position, said bimetallic bar bending normal to its length to shift the tab to release the moveable plate for movement to cause automatice belt rewind.

19. A retractor in accordance with claim 16 in which said remotely operated release means comprises a pivotally mounted lever, the lever being operated with opening or closing of the door to cause the moveable plate to shift to its release position thereby causing an automatic rewinding of the belt onto the reel.

20. In a safety belt retractor, the combination comprising:
a rotatable reel having a belt wound thereabout for protraction and retraction from the reel;
spring means biasing the reel to retract to rewind the belt into the reel;
a locking means for locking the belt against further protraction at the time of an accident;
a rotatable member connected to said reel to rotate therewith and having a friction surface thereon;
a coiled spring means having a coil for frictionally gripping said friction surface with a change in size of the coil to hold said member and said reel against rewinding the protracted belt thereby relieving tension of said spring means on the protracted belt worn by the occupant;
said coil of said spring having tangs at the ends thereof;
a pivotally mounted plate associated with said reel;
first and second engagement means on said plate for selective opeation with said tangs to change the size of the coil to either grip or release the frictional surface;
said pivotally mounted plate being biased to turn in one direction to move said engagement members theron relative to said tangs; and
a remotely operated means moveable to shift said pivotally mounted plate and the engagement means thereon to cause the coil spring to release the frictional surface and thereby cause automatic rewinding of the belt onto the reel.

21. A retractor in accordance with claim 20 in which said coiled spring means acts through one of said abutment means to bias the pivotally mounted plate to swing the latter and to cause the spring coil to release its grip and to initiate automatic rewind of the belt;
the remotely operated means having a member for blocking engagement with pivotally mounted plate to hold the same against the urging of the coiled spring means to cause automatic belt rewind;
said remotely operated means being operated by opening of a door to shift the member away from its blocking engagement with the pivotally mounted plate.

22. A retractor in accordance with claim 21 in which said first and second engagement members are projections on said plate for engaging the tangs to open the coil or to close the coil, said projections also having cam means thereon to cam the tang ends in a direction axially of the friction surface and thereby bias the coil to shift to axially along the frictional surface.

23. A retractor in accordance with claim 22 in which the remotely operated means comprises a bimetallic bar and in which the member on the remotely operated means comprises a portion of a free end of the bimetallic bar, said bimetallic bar being bent to remove said portion from blocking engagement with the removable plate.

24. A retractor in accordance with claim 21 in which said member of said remotely operated means comprises a lever end, said lever being pivoted to remove said end from blocking engagement with said pivotally mounted plate to allow automatic retraction of the belt on to the reel.

* * * * *